United States Patent
Timmireddy et al.

(10) Patent No.: US 12,254,253 B2
(45) Date of Patent: Mar. 18, 2025

(54) RESOURCE ESTIMATION FOR IMPLEMENTING CIRCUIT DESIGNS WITHIN AN INTEGRATED CIRCUIT

(71) Applicant: Xilinx, Inc., San Jose, CA (US)

(72) Inventors: Suman Kumar Timmireddy, Hyderabad (IN); Jaipal Reddy Nareddy, Hyderabad (IN); Rahul Kunwar, Serilingampally (IN); Adithya Balaji Boda, Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 586 days.

(21) Appl. No.: 17/520,087

(22) Filed: Nov. 5, 2021

(65) Prior Publication Data
US 2023/0144285 A1   May 11, 2023

(51) Int. Cl.
*G06F 30/31* (2020.01)
*G06Q 50/18* (2012.01)
*G06F 115/08* (2020.01)

(52) U.S. Cl.
CPC ........... *G06F 30/31* (2020.01); *G06Q 50/184* (2013.01); *G06F 2115/08* (2020.01)

(58) Field of Classification Search
CPC ...... G06F 21/566; G06F 21/53; G06F 21/562; G06F 21/567; G06F 21/563; G06F 2221/033; G06F 8/42; G06F 8/75; G06F 21/316; G06F 30/27; G06F 8/41; G06F 9/4552; G06F 21/56; G06F 21/577; G06F 2221/034; G06F 1/3225; G06F 1/324; G06F 1/3275; G06F 1/3287; G06F 1/329; G06F 1/3296; G06F 18/214; G06F 18/24; G06F 18/24143; G06F 2009/45587; G06F 21/32; G06F 2221/2139; G06F 30/327; G06F 9/45558; G06F 9/50; G06F 9/5094; G06F 11/3006; G06F 16/245; G06F 16/24554;
(Continued)

(56) References Cited

U.S. PATENT DOCUMENTS 7,636,907 B1   12/2009   Das et al.
7,902,477 B1   3/2011    Connolly
(Continued)

OTHER PUBLICATIONS https://scikit-learn.org/stable/supervised_learning.html#supervised-learning.
(Continued)

*Primary Examiner* — Binh C Tat
(74) *Attorney, Agent, or Firm* — Kevin T. Cuenot

(57) ABSTRACT

Resource estimation for implementing circuit designs in an integrated circuit (IC) can include detecting, using computer hardware, a plurality of Intellectual Property (IP) cores within a circuit design, extracting, using the computer hardware and from the circuit design, parameterizations for the plurality of IP cores as used in the circuit design, and selecting, using the computer hardware, a machine learning (ML) model corresponding to each IP core, wherein each selected ML model is specific to the corresponding IP core. Each selected ML model can be provided input specifying a target IC for the circuit design and the parameterization for the corresponding IP core. An estimate of resource usage for the circuit design can be generated by executing the selected ML models. The resource usage specifies an amount of resources of the target IC needed to implement the circuit design in the target IC.

20 Claims, 7 Drawing Sheets

(58) Field of Classification Search
CPC ............. G06F 16/24561; G06F 16/248; G06F 16/252; G06F 16/254; G06F 16/288; G06F 16/9024; G06F 16/9566; G06F 2119/06; G06F 2119/12; G06F 2221/031; G06F 3/0619; G06F 3/0659; G06F 3/0673; G06F 30/3312; G06F 30/35; G06F 30/39; G06F 11/0709; G06F 11/0751; G06F 11/0775; G06F 11/1402; G06F 11/1415; G06F 11/1435; G06F 11/3409; G06F 11/3433; G06F 11/3447; G06F 13/36; G06F 16/152; G06F 16/24568; G06F 16/285; G06F 16/35; G06F 18/40; G06F 21/31; G06F 21/40; G06F 21/55; G06F 21/552; G06F 21/554; G06F 21/565; G06F 21/57; G06F 21/604; G06F 2201/805; G06F 2201/82; G06F 2213/40; G06F 2221/2115; G06F 30/323; G06F 30/331; G06F 30/398; G06F 7/483; G06F 7/764; G06F 8/36; G06F 9/30079; G06F 9/4403; G06F 9/4406; G06F 9/5033; G06F 11/302; G06F 11/3058; G06F 11/3438; G06F 11/3466; G06F 16/212; G06F 16/217; G06F 16/2453; G06F 16/951; G06F 18/2113; G06F 18/213; G06F 18/2155; G06F 18/217; G06F 18/22; G06F 18/2415; G06F 18/25; G06F 18/285; G06F 21/45; G06F 21/52; G06F 21/564; G06F 21/568; G06F 21/60; G06F 21/6218; G06F 21/6245; G06F 21/6254; G06F 2115/08; G06F 2201/865; G06F 2201/88; G06F 2207/5521; G06F 2209/5017; G06F 2221/2103; G06F 30/31; G06F 30/34; G06F 7/4873; G06F 7/49915; G06F 7/49942; G06F 7/5525; G06F 7/556; G06F 8/71; G06F 9/30029; G06F 9/5044; G06F 9/5066; G06F 9/541; G06N 20/00; G06N 3/045; G06N 3/08; G06N 3/096

USPC .................................................. 716/100–108

See application file for complete search history.

(56) References Cited

U.S. PATENT DOCUMENTS

| 8,473,881 | B1 | 6/2013 | Fang et al. | |
|---|---|---|---|---|
| 2019/0205737 | A1* | 7/2019 | Bleiweiss | G06N 3/044 |
| 2019/0206090 | A1* | 7/2019 | Ray | G06T 9/002 |
| 2020/0186796 | A1* | 6/2020 | Mukherjee | H04N 19/107 |
| 2021/0073661 | A1* | 3/2021 | Matlick | H04L 61/3025 |

OTHER PUBLICATIONS

Fabian Pedregosa, et al., Scikit-learn: Machine Learning in Python, Journal of Machine Learning Research 12 (2011) 2825-2830.

* cited by examiner

| ML Model | IP Core | Records | Accuracy | Root Mean Square Error | Accuracy |
|---|---|---|---|---|---|
| 1 | lmb_v10 | 105, 42 | 94.37 | LUT: 3.25 | FFUtilizationFloat: 100.0<br>LUTUtilizationFloat: 88.746 |
| 2 | microblaze | 843, 486 | 97.6 | BRAM: 0.57<br>DSP: 0.37<br>FF: 88.76<br>LUT: 178.47<br>MemLUT: 8.76 | FFUtilizationFloat: 96.54<br>LUTUtilizationFloat: 97.14<br>MemoryLUTUtilizationFloat: 99.12 |
| 3 | rld3 | 9002, 268 | 99.2 | BRAM: 6.69e-05<br>BUFG: 0.14<br>FF: 10.93<br>LUT: 49.47<br>MemLUT: 4.22 | BRAMUtilizationFloat: 99.99<br>BUFGUtilizationFloat: 99.78<br>DSP48UtilizationFloat: 100.0<br>FFUtilizationFloat: 99.58<br>IOUtilizationFloat: 100.0<br>LUTUtilizationFloat: 99.58<br>MMCMUtilizationFloat: 100.0<br>MemoryLUTUtilizationFloat: 99.96<br>PLLUtilizationFloat: 100.0 |

FIG. 2

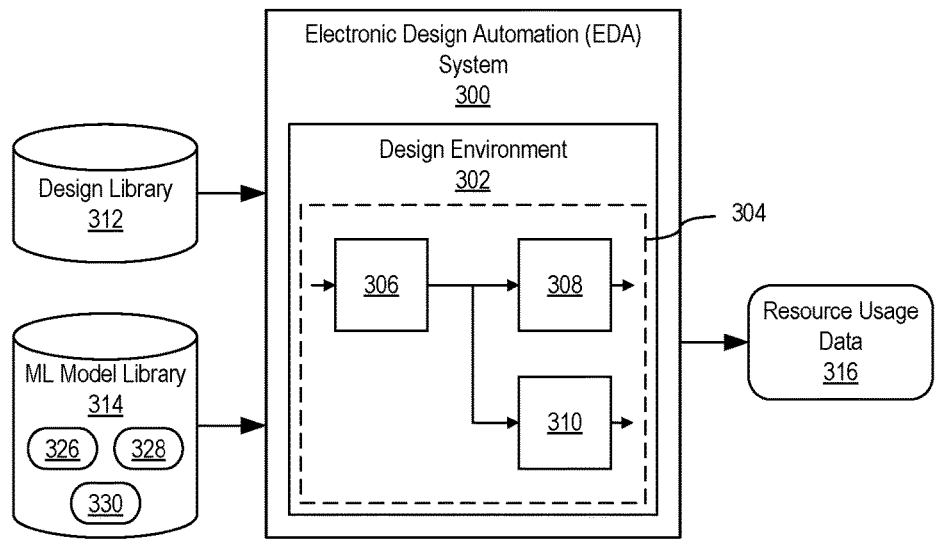

FIG. 3

| Resource | Used | Total | Utilization (%) |
|---|---|---|---|
| LUT | 69,332 | 663,360 | 10.45 |
| LUTRAM | 25,823 | 293,760 | 8.79 |
| BUFG | 102 | 1,248 | 8.17 |
| PLL | 1 | 8 | 12.50 |

RESOURCE ESTIMATION FOR IMPLEMENTING CIRCUIT DESIGNS WITHIN AN INTEGRATED CIRCUIT

TECHNICAL FIELD

This disclosure relates to Electronic Design Automation tools for integrated circuits (ICs) and, more particularly, to resource estimation for implementing a circuit design within an IC using EDA tools.

BACKGROUND

Users are able to create circuit designs within a design environment provided by a computer-based design tool referred to as an Electronic Design Automation (EDA) system. The design environment provided by an EDA system may use any of a variety of user-interface paradigms such as a command line interface or a drag-and-drop environment. Through the design environment, the user is able to include or instantiate various types of Intellectual Property (IP) cores in the circuit design from one or more available libraries. Once the circuit design is specified within the design environment, the user may invoke a design flow on the circuit design to physically realize the circuit design in a particular integrated circuit (IC) often referred to as the "target IC." The design flow typically includes operations such as synthesis, placement, and routing.

In the early stages of the design process, users have little to no information as to the size of the circuit design under development in terms of the amount of resources of the target IC needed to physically realize the circuit design. In a typical scenario, detailed and reliable information relating to resource usage of the circuit design is not available until the circuit design undergoes synthesis, placement, and/or routing. These operations, however, occur late in the design process. This means that a user may be unaware that a given circuit design may be too large to fit within the target IC until late stages in the design process (e.g., after synthesis, placement, and/or routing). Learning that the circuit design is too large for the target IC at this late stage of the development process often means significant redesign efforts are expended on the circuit design. In some cases, the user may need to begin the design process anew.

SUMMARY

In one or more example implementations, a method can include detecting, using computer hardware, a plurality of Intellectual Property (IP) cores within a circuit design, extracting, using the computer hardware and from the circuit design, parameterizations for the plurality of IP cores as used in the circuit design, and selecting, using the computer hardware, a machine learning (ML) model corresponding to each IP core. Each selected ML model is specific to the corresponding IP core. The method can include providing to each selected ML model as input a target integrated circuit (IC) for the circuit design and the parameterization for the corresponding IP core. The method also can include generating, by executing the selected ML models, an estimate of resource usage for the circuit design. The resource usage specifies an amount of resources of the target IC needed to implement the circuit design in the target IC.

In one or more example implementations, a system includes one or more processors configured to initiate operations. The operations can include detecting a plurality of IP cores within a circuit design, extracting, from the circuit design, parameterizations for the plurality of IP cores as used in the circuit design, and selecting an ML model corresponding to each IP core. Each selected ML model is specific to the corresponding IP core. The operations can include providing to each selected ML model as input a target IC for the circuit design and the parameterization for the corresponding IP core. The operations also can include generating, by executing the selected ML models, an estimate of resource usage for the circuit design. The resource usage specifies an amount of resources of the target IC needed to implement the circuit design in the target IC.

In one or more example implementations, a computer program product includes one or more computer readable storage media, and program instructions collectively stored on the one or more computer readable storage media. The program instructions are executable by computer hardware to initiate operations. The operations can include detecting a plurality of IP cores within a circuit design, extracting, from the circuit design, parameterizations for the plurality of IP cores as used in the circuit design, and selecting an ML model corresponding to each IP core. Each selected ML model is specific to the corresponding IP core. The operations can include providing to each selected ML model as input a target IC for the circuit design and the parameterization for the corresponding IP core. The operations also can include generating, by executing the selected ML models, an estimate of resource usage for the circuit design. The resource usage specifies an amount of resources of the target IC needed to implement the circuit design in the target IC.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 2 illustrates certain features of different ML models generated in accordance with the inventive arrangements described herein.

FIG. 3 illustrates an example of an Electronic Design Automation (EDA) system configured to use ML models to estimate resource usage of a circuit design.

DETAILED DESCRIPTION

Figure 1A:
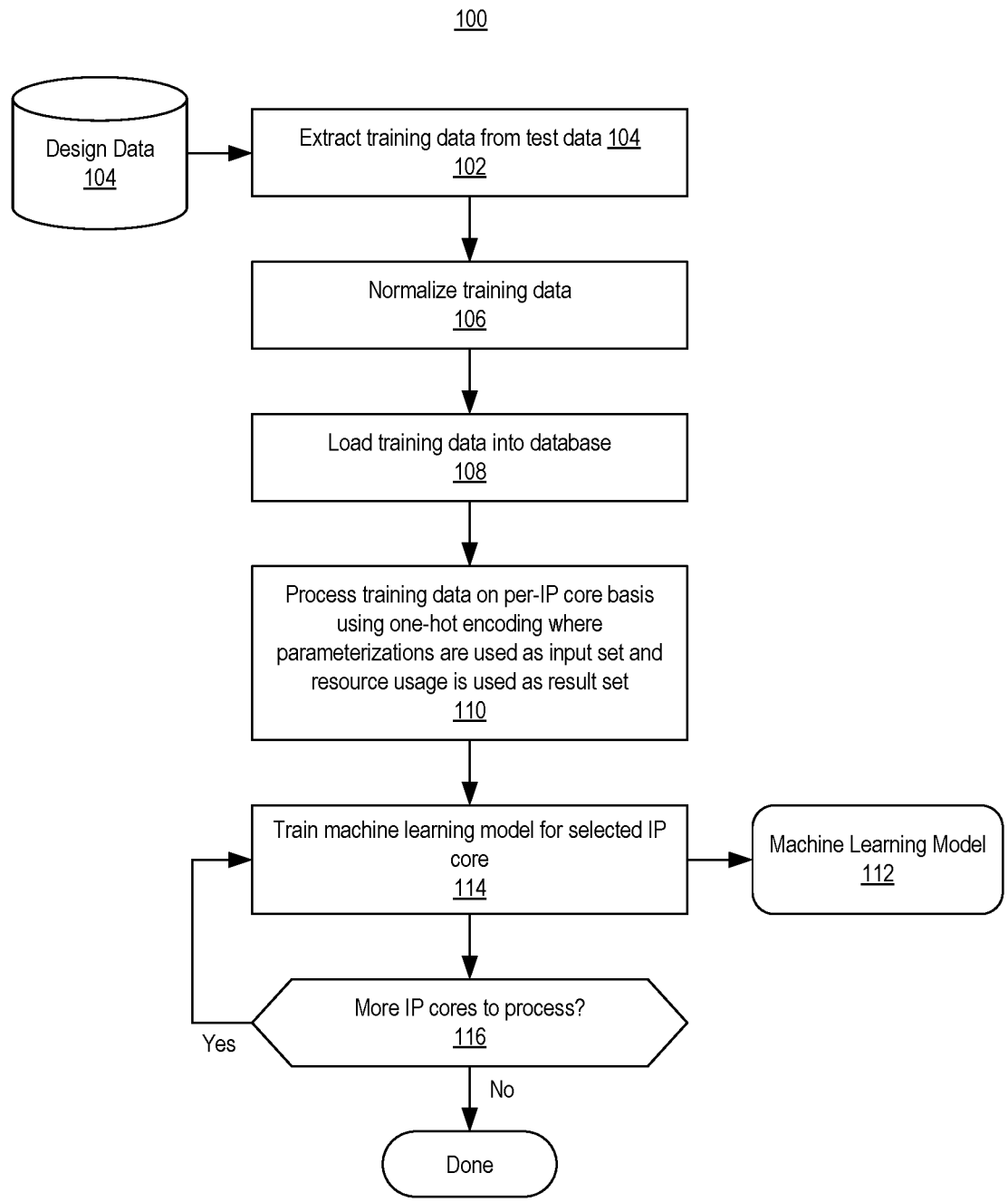
FIG. 1A is a block flow diagram illustrating an example of machine learning (ML) model generation for Intellectual Property (IP) cores.

This disclosure relates to Electronic Design Automation (EDA) tools for integrated circuits (ICs) and, more particularly, to resource estimation for implementing a circuit design within an IC using EDA tools. In conventional EDA systems, resource usage for Intellectual Property (IP) cores is reported subsequent to synthesis or post performance of a design flow (e.g., after synthesis, placement, and/or routing). For resources such as Lookup Tables (LUTs), Block Random-Access Memories (BRAMs), and buffers (BUFGs), for example, the user is not aware of how many of such resources an IP core, or a circuit design including one or more IP cores, requires until late in the design process.

Each IP core may have hundreds of user-specifiable or adjustable parameters. The resources needed to implement an IP core, however, can vary greatly with the values of these parameters, which are collectively referred to as a "parameterization" of the IP core. Given the large number of possible parameterizations for each IP core, storing all possible combinations of such parameters for an IP core along with the implementation details (e.g., resource usage) for each parameterization, and doing so for the many different IP cores available, is impractical.

In other cases, IP core providers attempt to provide metadata for the IP core that specifies an expected resource usage of the IP core for a given parameterization. In view of the large number of parameterizations possible, this data is often restricted to only the most widely used or popular parameterizations for the IP core. Further, the technique used to estimate resource usage is one that is deemed appropriate by the IP core developer for a particular IP core. These techniques may not be disclosed by the IP core developer to users and may not be uniformly applicable or generalized across other, different IP cores. Such data is also of limited use in terms of providing users with insight into resource usage of the IP core for those parameterizations not accounted for in the IP core metadata. Moreover, this data is available for only a small number of IP cores.

In accordance with the inventive arrangements described within this disclosure, an EDA system is capable of evaluating a circuit design, e.g., a user circuit design, using machine learning (ML) models to estimate the resources needed to implement the circuit design within a particular IC. The ML models may be trained using selected IP core parameterizations. Once trained, the ML models may be used to estimate resource usage for IP cores for any of the possible parameterizations of such IP cores.

In one or more example implementations, ML models may be generated on a per-IP core basis. For a given parameterization of a selected IP core, an ML model corresponding to the selected IP core is capable of outputting an estimate of the resources needed to implement that IP core in circuitry of a target IC. Within this disclosure, the term "target IC" or "target IC family" refers to the particular IC or the particular family of IC in which a circuit design is to be implemented (e.g., physically realized). Using a plurality of IP core-specific ML models, an estimate of the resources needed to implement a circuit design may be generated based on the particular IP cores included in the circuit design, the parameterizations of such IP cores, and the target IC and/or target IC family.

The estimate of resource usage may be provided for a circuit design that includes one or more particular IP cores. The estimate may be generated at early stages of the design process for the circuit design. For example, the estimate of resource usage may be generated during design entry prior to synthesis, placement, and/or routing. In one aspect, an EDA system may use the ML models to estimate resource usage based on IP cores detected within a circuit design, a selected parameterization for each IP core, and the target IC. This means that an estimate of the resource needed to implement a circuit design in a target IC may be generated for a block design (BD) type of circuit design, a block design container (BDC), or any of a variety of other types of circuit designs. The user need not wait until the circuit design is synthesized, placed, or routed to obtain an estimate of resource usage. Moreover, the estimate of resource usage has a high degree of accuracy, often at or above 90% accuracy. Based on the estimate, the EDA system is capable of indicating to the user whether a given circuit design is likely to fit in the selected IC.

FIG. 1A is a block flow diagram 100 illustrating an example of ML model generation for IP cores. The operations of block flow diagram 100 may be performed by a model generation (MG) system. The MG system may be implemented as a data processing system executing suitable operational software. In response to executing the operational software, the MG system is capable of performing the operations described within this disclosure to create ML models 112 trained as described. An example of a data processing system that may be used to implement an MG system is described in connection with FIG. 7. Once generated, ML models 112 may be incorporated into an EDA system and used to analyze circuit designs, e.g., user circuit designs, to generate estimates of the resources (e.g., estimates of resource usage) needed to implement the circuit designs in a target IC.

As defined herein, the term "Intellectual Property core" or "IP core" means a pre-designed and reusable unit of logic design, a cell, or a portion of chip layout design in the field of electronic circuit design. An IP core may be expressed as a data structure specifying a description of circuitry that performs a particular function. An IP core may be expressed using hardware description language file(s), as a netlist, as configuration data (e.g., sometimes referred to as a configuration bitstream) that programs a programmable IC, or the like. An IP core may be used as a building block within circuit designs adapted for implementation within an IC.

An IP core may include additional resources such as source code, scripts, high-level programming language models, schematics, documentation, constraints, and the like. Examples of different varieties of IP cores include, but are not limited to, digital signal processing (DSP) functions, memories, storage elements, math functions, etc. Some IP cores include an optimally floorplanned layout targeted to a specific family of ICs. IP cores may be parameterizable in that a user may enter a collection of one or more parameters, referred to as a "parameterization," to activate or change certain functionality of an instance of an IP core.

In one aspect, the resources measured for implementing user circuit designs may include, but are not limited to, the set of circuit blocks or sites available on an IC to which element of a circuit design may be assigned, placed, or implemented. The set of circuit blocks may be blocks or tiles of programmable circuitry and/or programmable logic. Examples of resources of an IC that may be used to implement IP cores that may be measured or quantified include, but are not limited to, LUTs, BRAMs, Buffers, Digital Signal Processing (DSP) blocks, and Phase-Locked Loops.

In block 102, the MG system is capable of extracting training data from design data 104. Design data 104 may be collected in several ways. In one aspect, design data 104 may be collected by running synthesis for a parameterization (e.g., sometimes called a configuration) of an IP core, where the results are captured during a regression run. In another aspect, randomized parameterizations of IP cores may be generated and synthesized with the results being captured.

In other examples, the design data 104 may include regression logs of various circuit designs. The circuit designs may be part of a library of test circuit designs (e.g., regression testing suites) that include various combinations of IP cores, where the IP cores have varying parameterizations. Each circuit design may include not only one or more different IP cores, but also one or more instances of the various IP cores where each instance of an IP core in the circuit designs has a corresponding parameterization and the parameterizations of instances of the same IP core may differ.

Regardless of the manner in which design data 104 is collected, the design data 104 may include implementation data such as the number of different types of resources used to implement the various circuit designs and/or different IP cores and/or parameterizations of IP cores. Such implementation data (e.g., resource usage data) may be obtained from implementation tools in consequence of processing the various circuit designs through a design flow (e.g., synthesis, placement, and/or routing) and evaluating or parsing the resulting design database. Further, the design data 104 may include implementation data for the different circuit designs, IP cores, and parameterizations of IP cores when implemented in target ICs and/or target IC families.

The term "IC family" refers to a group of one or more ICs that share similar circuit architecture features. ICs belonging to an IC family may have a minimum set of such architectural features, e.g., particular types of circuit blocks and the like. Different models of ICs in the same IC family may share the common minimum set of features and provide increasing functionality, e.g., increased capacity, from one IC to the next in the same IC family.

In an example implementation, the MG system is capable of extracting training data from the design data 104 where the training data includes a list of instances of the IP cores, parameterizations for the instances (e.g., a parameterization for each instance of each IP core if available), and resource usage data for the instances of IP cores (e.g., resource usage data for each instance of each IP core if available). In one aspect, the training data for a given IP core or instance thereof may be translated and stored as a tuple of the various items of data noted having a specific start tag and a specific end tag.

In another example implementation, the MG system is capable of extracting, from the design data 104, the target IC and/or target IC family in which the different circuit designs and/or IP cores were implemented or were to be implemented. That is, for a given instance of an IP core, the MG system may extract, as part of the training data, the particular target IC or target IC family to which the resource usage data of the instance of the IP core pertains.

In one or more example implementations, the design data 104 may include the configuration in effect in the EDA system at the time each implementation of a circuit design in design data 104 was generated. Within this disclosure, the EDA configuration also may be referred to as "hardware compiler settings" in reference to the particular options or parameters of the hardware compiler of the EDA system used to perform a design flow (e.g., synthesis, placement, and/or routing) on the circuit design. Hardware compiler settings may include directives for the hardware compiler.

In one aspect, the MG system is capable of extracting from design data 104 the hardware compiler settings used for each instance of an IP core included in the training data. Thus, for each instance of an IP core specified in the training data, the EDA configuration used to generate the implementation of the circuit design from which the resource usage data for the instance of the IP core was obtained may also be extracted as part of the training data. Such data may be stored as part of the tuple described.

As an illustrative and non-limiting example, a hardware compiler in the EDA system may be configured to process a circuit design through a design flow that optimizes the implementation of the circuit design for performance (e.g., data throughput). By comparison, the hardware compiler in the EDA system may be configured to process the circuit design through a design flow that optimizes the implementation of the circuit design for area (e.g., utilize a smaller area on the IC). Typically, a higher performance implementation of a circuit design will require more area and, as such, higher resource usage, on the IC than one that does not optimize for performance. The hardware compiler settings may include one or more parameters or compiler directives that control or select a particular strategy used in performing synthesis, placement, and/or routing, for example.

In block 106, the MG system is capable of normalizing the training data extracted from design data 104. For example, the MG system may place the training data into a uniform format across all sources. As described, the MG system may store each record as a tuple in a uniform format. In block 108, the MG system is capable of loading the training data, as normalized, into a database. In one aspect, as part of loading the training data into the database, the MG system is capable of performing additional operations such as deduplication of the training data (e.g., removing any duplicate rows).

In block 110, the MG system is capable of applying one-hot encoding to the database where the parameterizations are used as the input set and the resource usage is used as the result set. In one aspect, as part of one-hot encoding, e.g., after the one-hot encoding is performed, the MG system is capable of performing a further processing step where any rows filled with only zeros are removed from the database and any columns with only zeros are removed from the database. This prevents overfitting the data during the training process.

In block 114, the MG system is capable of generating an ML model 112 for each IP core in the training data. That is, the MG system may use a particular machine learning technique to train an ML model 112 for each IP core from the training data. As shown, for each IP core, the MG system is capable of outputting an ML model 112. Each ML model 112 generated corresponds to, and is specific to, a particular IP core.

In block 116, the MG system determines whether there are any further IP cores of the training data to process. In response to determining that one or more IP cores in the training data have not yet been processed, the MG system loops back to block 114 to generate and/or train a further ML model 112 for another IP core. In response to determining that no further IP cores remain to be processed from the training data, block flow diagram 100 may end.

In one or more example implementations, the MG system uses a Gradient Boosting Regressor technique for training the ML models 112. An example of a Gradient Boosting Regressor software toolkit that may be used is available from "scikit-learn" as discussed in "Scikit-learn: Machine Learning in Python," Pedregosa et al., JMLR 12, pp. 2825-2830, 2011. In general, the Gradient Boosting Regressor technique works by trying to fit a decision tree built at each stage on top of an existing model by a certain deviation.

The Gradient Boosting Regressor technique utilizes three primary parameters for tuning (e.g., training) the ML models 112. These parameters include learning_rate, n_estimators, and max_depth. The learning_rate parameter determines shrinkage of the decision tree for each iteration to fit new data. Shrinkage refers to shrinking regression coefficients to zero and, as such, reducing the impact of potentially unstable regression coefficients. For example, learning_rate determines the fraction of the decision tree that changes itself to adapt to the new data. The n_estimators parameter specifies a number of iterations to be performed for data fitting. Larger values for n_estimators lead to increased accuracy at the expense of generating larger ML models. The max_depth parameter specifies the height of the decision tree generated as the ML model. A combination of these parameters determines the accuracy of the prediction or estimate obtained from the ML model that is generated and the size of the ML model. For example, increasing the number of iterations (learning_rate) may result in a more accurate fit for the training data at the cost of increasing the installation size of the resulting ML model and increasing the inference time (e.g., execution time of the ML model).

In one or more example implementations, the resulting ML models 112 were trained using 80% of the training data and tested using the remaining 20% of the training data. The ML models 112 generated using the Gradient Boosting Regressor technique achieved a 90% or higher accuracy rate on the test data.

Figure 1B:
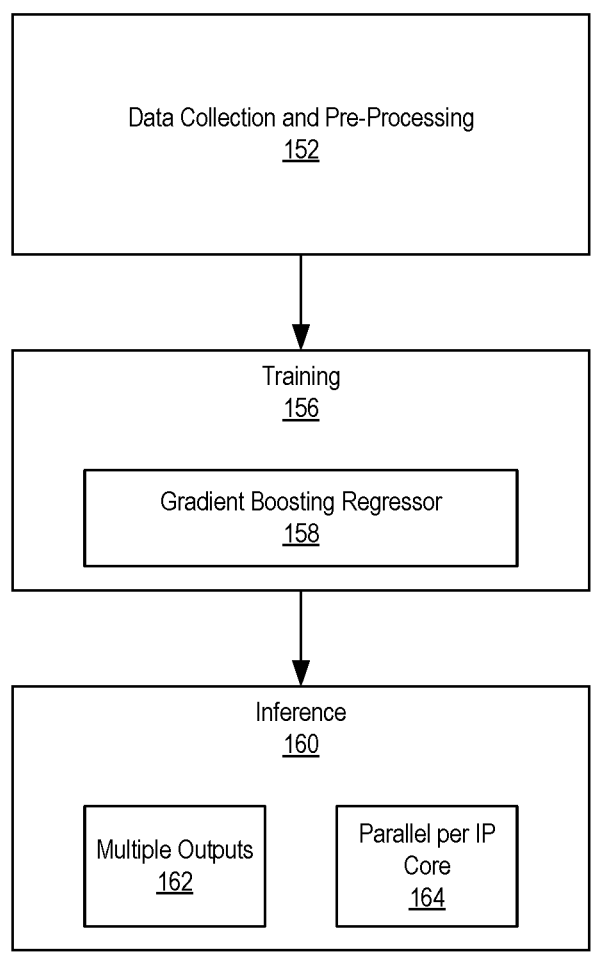
FIG. 1B is a block flow diagram illustrating an example of ML model generation and usage for IP cores.

FIG. 1B is a block flow diagram 150 illustrating an example of ML model generation and usage for IP cores. In block 152, the MG system is capable of performing data collection and pre-processing. Data collection may be performed by way of the various techniques described herein (e.g., synthesizing parameterized IP cores, randomized IP configuration/parameterization tests, and/or circuit design regression data) to generate design data 104. In one aspect, the MG system pre-processes the data, e.g., extract the data as per block 102 and normalize the data as per block 106, before storing the resulting data in a database. In block 156, the MG system performs training using the Gradient Boosting Regressor technique 158. In one aspect, 80% of the data may be used for training, while 20% is used for testing.

In block 160, an EDA system is capable of operating on a circuit design to perform inference. Inference refers to deploying the generated ML models as part of an EDA system to generate estimates of resource usage for user circuit designs. In one aspect, each ML model may be IP core specific and capable of generating or outputting multiple outputs 162 for a given parameterization of an IP core. Multiple outputs 162 refer to the usage estimate for each of a plurality of different resources of the target IC and/or target IC family. For example, an ML model as described herein may generate multiple outputs 162 that include an estimate of LUT usage, BRAM usage, flip-flop usage, buffer usage, and/or other device usage for the target IC or target IC family. In performing block 160, the EDA system is capable of executing multiple ML models in parallel on a per IP core basis (164), where each ML model generates multiple outputs 162. That is, the EDA system is capable of executing multiple ML models to generate the multiple output usage data for different IP core instances for an entire circuit design (e.g., on a per-IP core basis and/or per-IP core parameterization basis) and then aggregate the results at the design level.

FIG. 2 illustrates certain features of different ML models generated in accordance with the inventive arrangements described herein. The example ML models 1, 2, and 3 corresponding to respective IP cores Imb_v10, microblaze, and rld3 were created using the Gradient Boosting Regressor technique. In the example of FIG. 2, Imb_v10 refers to a memory bus IP core. Microblaze refers to a soft processor type of IP core capable of executing program code. Rld3 refers to a memory controller IP core.

In the example of FIG. 2, the learning_rate parameter was set to 0.1; the n_estimators parameter was set to 100; and the max_depth parameter was set to 4. This combination of parameter values, using the Gradient Boosting Regressor technique, resulted in a high degree of ML model accuracy while also keeping the size of ML models 1, 2, and 3 relatively small.

Referring to the table of FIG. 2, the "IP Core" column specifies the type of IP core for which the ML model was created. The "Records" column indicates the number of records from the database (first number) and the number of nodes in the decision tree (second number) used to generate the ML model. The "Accuracy" column is the mean overall accuracy percentage achieved by the ML model in terms of estimating resource usage for the IP core given a target IC or target IC family. The "Root Mean Square Error" column provides the deviation for the different types of resources listed. The "Accuracy" column indicates the individual accuracy of each of the resources listed.

Table 1 illustrates the relationship between ML model accuracy and size using various values for the learning_rate, n_estimators, and max_depth parameters when using the Gradient Boosting Regressor technique.

TABLE 1

| Learning Rate | N Estimators | Max Depth | ML Model Size (Bytes) | ML Model Accuracy (%) |
|---|---|---|---|---|
| 0.01 | 1000 | 3 | 8,065,816 | 96.56 |
| 0.01 | 1000 | 4 | 10,009,508 | 96.73 |
| 0.01 | 100 | 3 | 875,295 | 82.25 |
| 0.01 | 100 | 4 | 1,121,544 | 84.64 |
| 0.1 | 1000 | 3 | 7,673,752 | 96.47 |
| 0.1 | 1000 | 4 | 8,841,857 | 96.91 |
| 0.1 | 100 | 3 | 864,273 | 96.20 |
| 0.1 | 100 | 4 | 1,047,529 | 96.72 |
| 0.1 | 100 | 5 | 1,350,766 | 96.93 |

FIG. 3 illustrates an example of an EDA system 300 configured to use ML models to estimate resource usage of a circuit design. In the example, EDA system 300 is shown. EDA system 300 may be implemented as a data processing system, e.g., a computer, executing suitable operational software. An example of a data processing system that may be used to implement EDA system 300 is described in connection with FIG. 7.

In the example of FIG. 3, EDA system 300 is capable of providing a design environment 302. In the example, the design environment 302 is a graphical user interface (GUI) based design environment where users may create a BD representation of a circuit design. A "block design" or "BD" is a graphical representation of a circuit design or a portion of a circuit design displayed using a GUI. The block design is formed of one or more graphical blocks or simply "blocks," where each block represents a circuit function. The user may connect the blocks of the block design using lines that represent connections (e.g., wires or signals) between the blocks. The lines define connectivity among the blocks of the block design. Each block of the block design may be associated with one or more parameters defining how that block is to be physically realized in circuitry. Blocks of a block design may represent IP cores and/or block design containers or "BDCs." The set of parameters for the block, taken collectively, may be the parameterization for the IP core.

As defined within this disclosure, the term "block design container" or "BDC" means a pre-designed and reusable unit of circuit design hierarchy including one or more blocks of a block design in the field of electronic circuit design. A BDC may be expressed as a data structure specifying such hierarchy. Unlike IP cores, a BDC, when instantiated as a child within a parent block design or within a parent BDC, may be expanded to reveal the constituent blocks and/or BDs, and connectivity of the constituent blocks of the child blocks or BDs within the development environment of the parent. Further, unlike IP cores or other blocks of a block design, the source or sources of a BDC may be loosely coupled to the BDC itself. This allows a single BDC to be associated with one or more different alternative sources (e.g., IP cores), also referred to as variants. A source, or variant, may specify a block design or a simulation model. A BDC may include a list of one or more sources that are to be used for purposes of synthesis and/or a list of one or more source files that may be used for purposes of simulation.

As an illustrative and non-limiting example, a source that specifies a block design specifies one or more blocks (IP cores and/or child BDCs), connectivity of the blocks, and/or parameterizations for the blocks. A source for simulation specifies a simulation model to be used for a BDC for purposes of simulation.

In other arrangements, the design environment 302 may be based on another paradigm such as a command line. In the example of FIG. 3, use of a GUI and block design environment is for purposes of illustration.

In the example, a user has created a circuit design 304. Circuit design 304, which, as noted, is a block design in this example, includes blocks (e.g., IP cores and/or BDCs) 306, 308, and 310 being connected as shown. The user may create circuit design 304 using blocks obtained from design library 312. As part of creating circuit design 304, the user may also specify the target IC or target IC family in which circuit design 304 is to be implemented. This information, along with any parameterizations specified for blocks 306, 308, and/or 310, may be stored as part of the circuit design 304 (e.g., as part of the project file or design database for circuit design 304).

In the example, the user may provide an input to EDA system 300 that initiates resource estimation operations performed on circuit design 304 using ML model library 314. As an example, the user may select a "validate design" option that initiates the resource estimation described herein. EDA system 300 is capable of applying the ML models contained therein to generate resource usage data 316.

In the example, ML model library 314 includes a plurality of ML models 326, 328, and 330 corresponding to blocks 306, 308, and 310, respectively. It should be appreciated that ML model library 314 may include more ML models than illustrated in FIG. 3. EDA system 300 is capable of generating an estimate of resource usage for each block 306, 308, and 310 by executing the corresponding ML models.

For example, EDA system 300 is capable of executing ML model 326 to generate an estimate of resource usage for block 306. EDA system 300 is capable executing of executing ML model 328 to generate an estimate of resource usage for block 308. EDA system 300 is capable of executing of executing ML model 330 to generate an estimate of resource usage for block 310. In executing each of the respective ML models, EDA system 300 is capable of providing each ML model with the data input necessary to generate the estimate of resource usage. The data input will depend on the particular training of the ML models.

In one or more example implementations, EDA system 300 is capable of providing the parameterization of each block to the respective ML model along with the target IC or target IC family in which circuit design 304 is to be implemented. In another example implementation, the data input provided to each ML model may include the hardware compiler settings to be used by the EDA system 300. In still other example implementations, the EDA system 300 may return multiple different resource usage estimates for each block (e.g., from each model) where each different estimate is for a particular set of hardware compiler settings.

Having obtained estimates of resource usage for each of blocks 306, 308, and 310 using respective ML models 326, 328, and 330, EDA system 300 is also capable of determining an estimate of resource usage for the entire circuit design 304. For example, EDA system 300 may sum the respective types of resources estimated to be needed for each of blocks 306, 308, and 310 and output the results. Further, EDA system 300 is capable of comparing the estimates of resource usage for the circuit design 304 with known availability of the various different types of resources available on the target IC and/or target IC family to determine whether the user's circuit design 304 will fit within the target IC or target IC family (or which target IC of the target IC family has sufficient resources). That is, the EDA system 300 determines whether the number of each respective resource type is less than or equal to the available number of such resources in the target IC or target IC family.

It should be appreciated that the EDA system 300 is capable of generating resource usage data on a per IP core basis (e.g., or per BD basis), or for the circuit design which may include a plurality of entities. Further, EDA system 300 is also capable of generating resource estimates for Hierarchical IP cores and for BDCs.

Figures 4, 5:
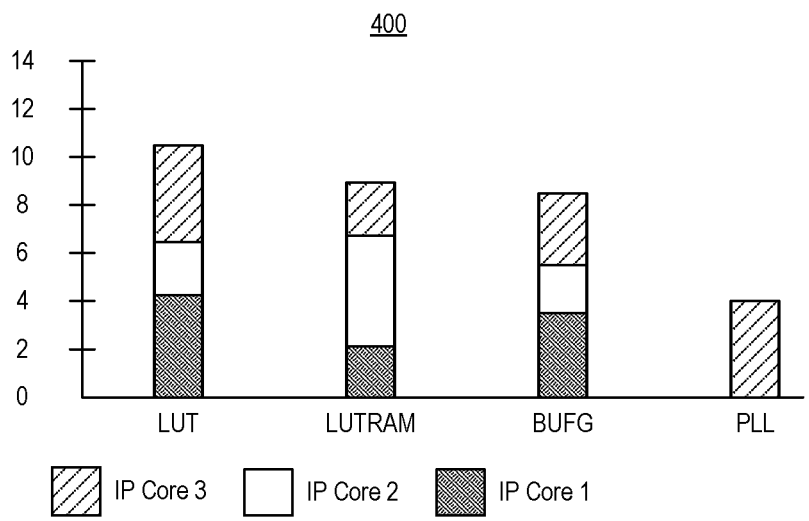
FIG. 4 illustrates an example graphical user interface (GUI) that may be generated by an EDA system to provide estimates of resource usage for a circuit design.
FIG. 5 illustrates another example GUI that may be generated by an EDA system to provide estimates of resource usage for a circuit design.

FIG. 4 illustrates an example GUI 400 that may be generated by EDA system 300 to provide estimates of resource usage for a circuit design. In the example, the estimate for each of the different resources LUTs, LUTRAMs, BUFGs (buffers), and PLLs is illustrative of the multiple output capability of each of the ML models used. GUI 400 illustrates the number of each resource used by the respective IP cores 1, 2, and 3 of the circuit design as well as an estimate of the total amount of each resource used by the circuit design across each of the respective IP cores (and/or instances thereof).

FIG. 5 illustrates an example GUI 500 that may be generated by EDA system 300 to provide estimates of resource usage for a circuit design. In the example, the "Resource" column lists the particular type of resources of the target IC in which the circuit design is to be implemented. The "Used" column specifies the estimated number of such resources that the circuit design will use. The "Total" column indicates the total number of such resources available on the target IC. The "Utilization (%)" column indicates the percentage of the available resources of the target IC that the circuit design is estimated to use. For example, utilization in terms of a percentage is the estimated number of LUTs used (69,332) divided by the total number of LUTs available on the IC (663,360) times 100.

In one or more other example implementations, ML models 112 may be generated using other known ML model generation and/or training techniques. For example, in a particular example, the MG system can generate ML models 112 using a Random Forest Regressor technique. In using the Random Forest Regressor technique, ML models are built by averaging the estimation, whereas the Gradient Boosting Regressor technique builds the ML models 112 by incremental change to the decision tree with the training data. In using the Random Forest Regressor technique, the grid search methodology was used, which automatically tunes the ML model to increase accuracy.

Table 2 illustrates differences between ML models generated using the Gradient Boosting Regressor (GBR) technique and the Random Forest Regressor (RFR) technique.

TABLE 2

| IP Core | GBR Accuracy (%) | RF Accuracy (%) |
| --- | --- | --- |
| lbm_bram_if_cntlr | 91.25 | 91.53 |
| cmpy | 83.05 | 60.49 |
| aurora_8b10b | 78.34 | 77.73 |
| axis_protocol_checker | 85.40 | 86.59 |
| axis_combiner | 92.45 | 83.66 |
| axi_perf_monitor | 94.49 | 93.19 |
| v_axi4s_remap | 89.88 | 67.07 |
| axi_mmu | 96.65 | 83.84 |
| canfd | 99.37 | 99.22 |
| axi_eithernetlite | 98.04 | 93.49 |
| axi_dwidth_converter | 91.37 | 96.01 |
| Microblaze | 97.33 | 93.53 |

As illustrated in Table 2, high levels of accuracy may be achieved by ML models generated using the Random Forest Regressor technique. The ML models generated using the Gradient Boosting Regressor technique achieve higher levels of accuracy.

Figure 6:
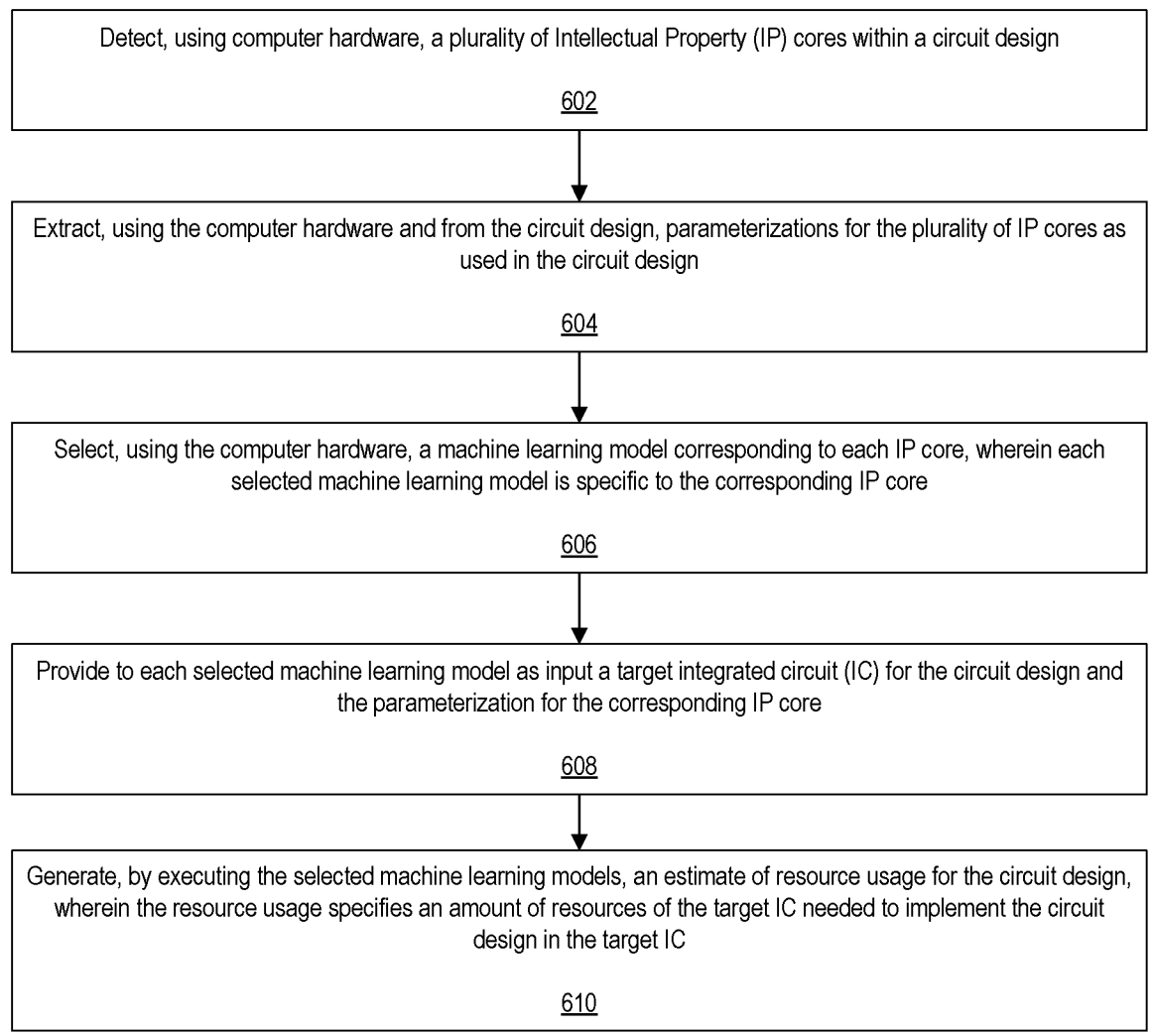
FIG. 6 illustrates an example method of using ML models to estimate resource usage of a circuit design.

FIG. 6 illustrates an example method 600 of using ML models to estimate the resource usage of a circuit design. Method 600 may be performed by an EDA system as described herein. Method 600 may begin in a state where a user has created a circuit design. The circuit design may include one or more IP cores and/or multiple instances of IP cores with the same or varying parameterizations. Further, the user has specified a target IC for the circuit design. It should be appreciated that while the term "circuit design" is used, the circuit design may include a single IP core, a plurality of IP cores, or other structures such as BDCs that include one or more IP cores, or any combination thereof with varying levels of complexity. Method 600 may be performed by the EDA system prior to performing synthesis, placement, or routing (e.g., prior to performing any portion of a design flow).

The foregoing and other implementations can each optionally include one or more of the following features, alone or in combination. Some example implementations include all the following features in combination.

In block 602, the EDA system is capable of detecting a plurality of IP cores within the circuit design. In block 604, the EDA system is capable of extracting, from the circuit design, parameterizations for the plurality of IP cores as used in the circuit design. The EDA system may also extract the parameterization for each instance of each IP core or at least each different parameterization for each IP core. The EDA system may also extract the target IC and/or target IC family from the circuit design or receive such information from the user as an input.

In block 606, the EDA system is capable of selecting an ML model corresponding to each IP core, wherein each selected ML model is specific to the corresponding IP core.

In one aspect, each selected ML model is trained to generate estimates of resource usage for different parameterizations of the corresponding IP core and for different target ICs and/or target IC families.

In another aspect, each selected ML model also is trained to generate estimates of resource usage based on different hardware compiler settings used to implement the circuit design. The hardware compiler settings may include various parameters of the EDA system for performing operations such as synthesis, placement, and/or routing. Hardware compiler settings may also include compiler directives including compiler directives for any of the operations of a design flow.

In block 608, the EDA system is capable of providing to each selected ML model as input a target IC and/or target IC family for the circuit design and the parameterization for the corresponding IP core.

In cases where the ML models are also trained using hardware compiler settings, the method may include providing, to each selected ML model, a selected hardware compiler setting to be used to process the circuit design. By accounting for hardware compiler settings, resource usage estimation technology (e.g., the ML models) are able to account for changes in the underlying implementation tools from one release to another. Thus, the ML models may adapt with changing implementation technologies over time.

In block 610, the EDA system is capable of generating, by executing the selected ML models, an estimate of resource usage for the circuit design. The resource usage specifies an amount of resources of the target IC and/or target IC family needed to implement the circuit design therein. In generating the estimate of resource usage for the circuit design, it should be appreciated that the EDA system is also capable of generating estimates of resource usage for each instance of an IP core and further estimates of resource usage for particular resources (e.g., LUTs, Buffers, etc.) for particular instances of IP cores. Such results may be summed to obtain the estimates of resource usage for the circuit design as a whole.

In another aspect, the EDA system may generate the estimate of resource usage by executing at least two of the selected ML models concurrently in different processes of the computer hardware. That is, the EDA system is capable of executing multiple ML models concurrently or in parallel as part of the generating operation, where each of the concurrently executed ML models executes in a different process of the data processing system. The number of processes may be constrained by the processor cores available in the EDA system.

In another aspect, the circuit design includes a plurality of instances of a selected IP core from the plurality of IP cores detected in the circuit design. The plurality of instances of the selected IP core have a plurality of different parameterizations. In that case, the EDA system may execute the selected ML model for the selected IP core a number of times corresponding to (e.g., equal to) a number of different parameterizations of the selected IP core specified in the circuit design to estimate resource usage for each of the plurality of instances of the corresponding IP core having a different parameterization.

For example, the EDA system need only execute the ML model for an IP core one time for each different parameterization of the IP core in the circuit design. Subsequent executions of an ML model for a same parameterization of the IP core may be duplicative when the results of the first execution may be cached and re-used for each other instance of the IP core having the same parameterization.

In another aspect, the method includes comparing the estimate of resource usage with an amount of resources available on the target IC and/or target IC family and indicating, based on the comparing, whether the circuit design fits on the target IC and/or in the target IC family. As noted, the EDA system may also recommend a particular target IC from the target IC family that has enough resources to implement the circuit design.

In another aspect, the estimates of resource usage are specified on a per IP core basis. The method can include caching the estimates of resource usage for each IP core. The method can include determining a further estimate of resource usage for a modified version of the circuit design, e.g., at a later time, by using a cached estimate of a selected IP core of the circuit design that has a same parameterization in the circuit design and the modified circuit design.

For example, the EDA system may reuse cached estimates of resource usage for those instances of IP cores that did not change from the original circuit design to the modified version of the circuit design. This allows subsequent estimating to be performed faster, e.g., in less runtime, since ML models corresponding to reused and cached estimates need not be loaded and/or executed.

Figure 7:
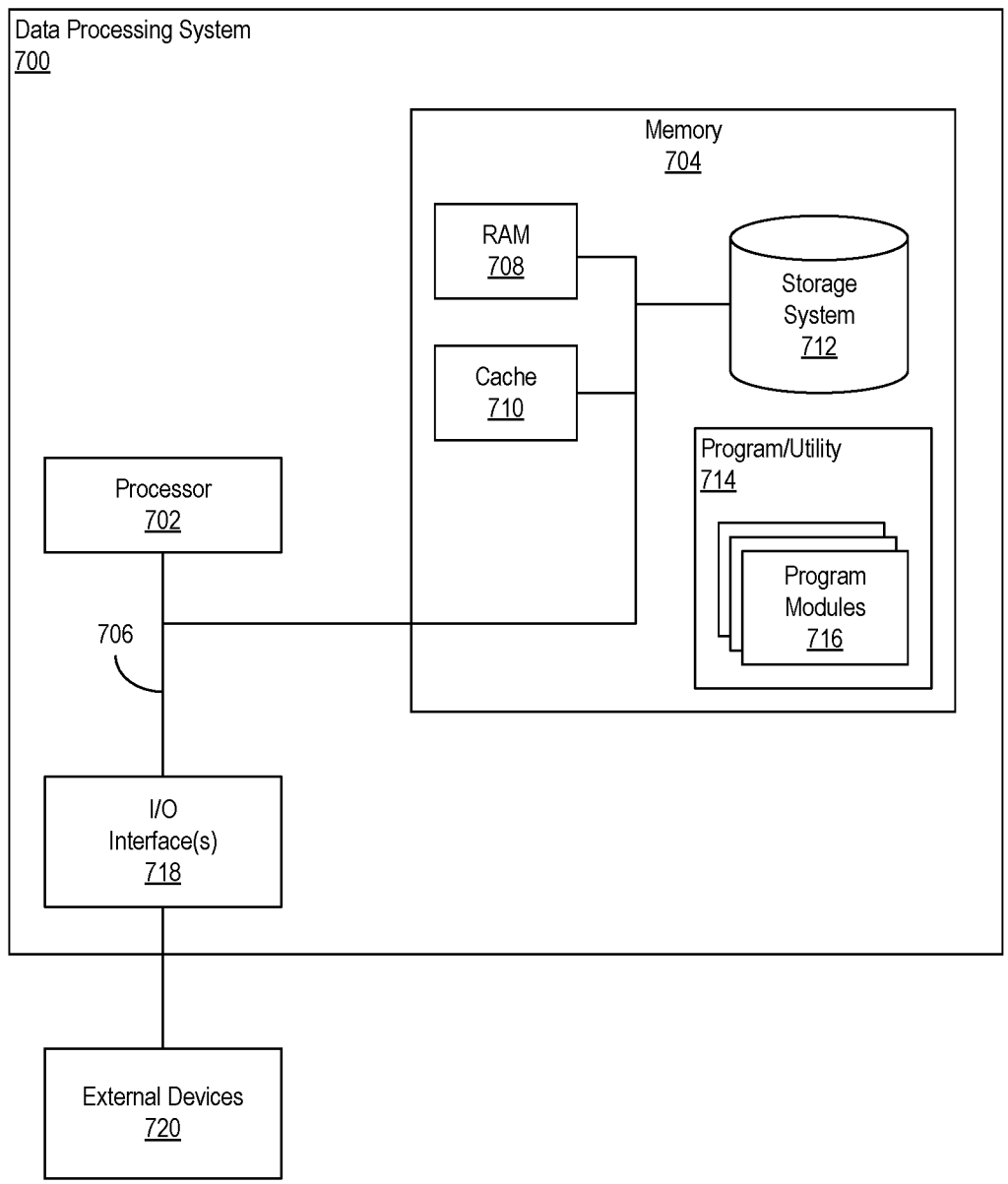
FIG. 7 illustrates an example of a data processing system for use with the inventive arrangements described within this disclosure.

FIG. 7 illustrates an example implementation of a data processing system 700. As defined herein, "data processing system" means one or more hardware systems configured to process data, each hardware system including at least one processor programmed to initiate operations and memory.

The components of data processing system 700 can include, but are not limited to, a processor 702, a memory 704, and a bus 706 that couples various system components including memory 704 to processor 702. Processor 702 may be implemented as one or more processors. In an example, processor 702 is implemented as a central processing unit (CPU). Example processor types include, but are not limited to, processors having an x86 type of architecture (IA-32, IA-64, etc.), Power Architecture, ARM processors, and the like. As defined herein, the term "processor" means at least one circuit capable of carrying out instructions contained in program code. The circuit may be an integrated circuit or embedded in an integrated circuit.

Bus 706 represents one or more of any of a variety of communication bus structures. By way of example, and not limitation, bus 706 may be implemented as a Peripheral Component Interconnect Express (PCIe) bus. Data processing system 700 typically includes a variety of computer system readable media. Such media may include computer-readable volatile and non-volatile media and computer-readable removable and non-removable media.

Memory 704 can include computer-readable media in the form of volatile memory, such as random-access memory (RAM) 708 and/or cache memory 710. Data processing system 700 also can include other removable/non-removable, volatile/non-volatile computer storage media. By way of example, storage system 712 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 706 by one or more data media interfaces. Memory 704 is an example of at least one computer program product.

Program/utility 714, having a set (at least one) of program modules 716, may be stored in memory 704. Program/utility 714 is executable by processor 702. By way of example, program modules 716 may represent an operating system, one or more application programs, other program modules, and program data. Program modules 716, upon execution, cause data processing system 700, e.g., processor 702, to carry out the functions and/or methodologies of the example implementations described within this disclosure. Program/utility 714 and any data items used, generated, and/or operated upon by data processing system 700 are functional data structures that impart functionality when employed by data processing system 700. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

For example, one or more program modules 716, when executed, may implement an MG system as described herein. In another example, one or more modules 716, when executed, may implement an EDA system as described herein. Program modules 716, as part of implementing an EDA system, may include software that is capable of performing a design flow (e.g., synthesis, placement, and/or routing) on a circuit design or portion thereof so that a circuit design may be physically realized in an IC. It should be appreciated that while data processing system 700 is used as an example implementation of the MG system and the EDA system, such systems may be implemented in the same data processing system or in different data processing systems.

Data processing system 700 may include one or more Input/Output (I/O) interfaces 718 communicatively linked to bus 706. I/O interface(s) 718 allow data processing system 700 to communicate with one or more external devices 720 and/or communicate over one or more networks such as a local area network (LAN), a wide area network (WAN), and/or a public network (e.g., the Internet). Examples of I/O interfaces 718 may include, but are not limited to, network cards, modems, network adapters, hardware controllers, etc. Examples of external devices also may include devices that allow a user to interact with data processing system 700 (e.g., a display, a keyboard, and/or a pointing device) and/or other devices such as accelerator card.

Data processing system 700 is only one example implementation. Data processing system 700 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

The example of FIG. 7 is not intended to suggest any limitation as to the scope of use or functionality of example implementations described herein. Data processing system 700 is an example of computer hardware that is capable of performing the various operations described within this disclosure. In this regard, data processing system 700 may include fewer components than shown or additional components not illustrated in FIG. 7 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Data processing system 700 may be operational with numerous other general-purpose or special-purpose computing system environments or configurations. Examples of computing systems, environments, and/or configurations that may be suitable for use with data processing system 700 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Some computing environments, e.g., cloud computing environments and/or edge computing environments using data processing system 700 or other suitable data processing system, generally support the FPGA-as-a-Service (FaaS) model. In the FaaS model, user functions are hardware accelerated as circuit designs implemented within programmable ICs operating under control of the (host) data processing system. Other examples of cloud computing models are described in the National Institute of Standards and Technology (NIST) and, more particularly, the Information Technology Laboratory of NIST.

Figure 8:
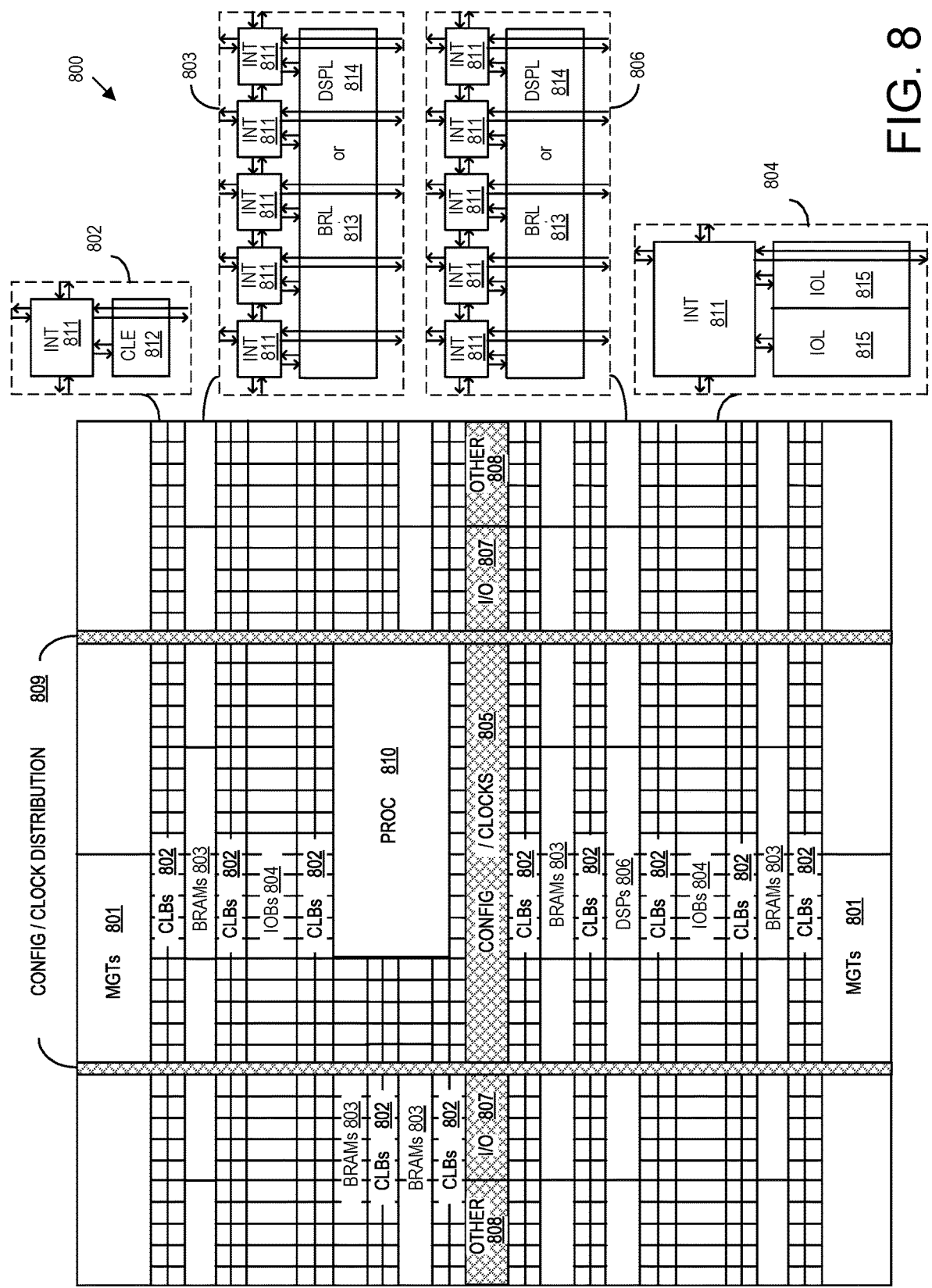
FIG. 8 illustrates an example architecture for an integrated circuit (IC) that may be used to implement the example circuit designs described herein.

FIG. 8 illustrates an example architecture 800 for an IC that may be used to implement the example circuit designs described herein. The various circuit blocks and/or components described in connection architecture 800 are also examples of resources of a target IC and/or target IC family for which ML models, as described herein, may be used to generate estimates of resource usage.

In one aspect, architecture 800 may be implemented within a programmable IC. A programmable IC is an IC with at least some programmable circuitry. Programmable circuitry may include programmable logic. For example, architecture 800 may be used to implement a field programmable gate array (FPGA). Architecture 800 may also be representative of a system-on-chip (SoC) type of IC. An example of an SoC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 800 includes several different types of programmable circuit, e.g., logic, blocks. For example, architecture 800 may include a large number of different programmable tiles including multi-gigabit transceivers (MGTs) 801, configurable logic blocks (CLBs) 802, random-access memory blocks (BRAMs) 803, input/output blocks (IOBs) 804, configuration and clocking logic (CONFIG/CLOCKS) 805, digital signal processing blocks (DSPs) 806, specialized I/O blocks 807 (e.g., configuration ports and clock ports), and other programmable logic 808 such as digital clock managers, analog-to-digital converters, system monitoring logic, and so forth.

In some ICs, each programmable tile includes a programmable interconnect element (INT) 811 having standardized connections to and from a corresponding INT 811 in each adjacent tile. Therefore, INTs 811, taken together, implement the programmable interconnect structure for the illustrated IC. Each INT 811 also includes the connections to and from the programmable logic element within the same tile, as shown by the examples included at the right of FIG. 8.

For example, a CLB 802 may include a configurable logic element (CLE) 812 that may be programmed to implement user logic plus a single INT 811. A BRAM 803 may include a BRAM logic element (BRL) 813 in addition to one or more INTs 811. Typically, the number of INTs 811 included in a tile depends on the height of the tile. As pictured, a BRAM tile has the same height as five CLBs, but other numbers (e.g., four) also may be used. A DSP tile 806 may include a DSP logic element (DSPL) 814 in addition to an appropriate number of INTs 811. An 10B 804 may include, for example, two instances of an I/O logic element (IOL) 815 in addition to one instance of an INT 811. The actual I/O pads connected to IOL 815 may not be confined to the area of IOL 815.

In the example pictured in FIG. 8, the shaded area near the center of the die, e.g., formed of regions 805, 807, and 808, may be used for configuration, clock, and other control logic. Shaded areas 809 may be used to distribute the clocks and configuration signals across the breadth of the programmable IC.

Some ICs utilizing the architecture illustrated in FIG. 8 include additional logic blocks that disrupt the regular columnar structure making up a large part of the IC. The additional logic blocks may be programmable blocks and/or dedicated circuitry. For example, a processor block depicted as PROC 810 spans several columns of CLBs and BRAMs.

In one aspect, PROC 810 may be implemented as dedicated circuitry, e.g., as a hardwired processor, that is fabricated as part of the die that implements the programmable circuitry of the IC. PROC 810 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 810 may be omitted from architecture 800 and replaced with one or more of the other varieties of the programmable blocks described. Further, such blocks may be utilized to form a "soft processor" in that the various blocks of programmable circuitry may be used to form a processor that can execute program code as is the case with PROC 810.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 8 that are external to PROC 810 such as CLBs 802 and BRAMs 803 are considered programmable circuitry of the IC.

In general, the functionality of programmable circuitry is not established until configuration data is loaded into the IC. A set of configuration bits may be used to program programmable circuitry of an IC such as an FPGA. In general, programmable circuitry is not operational or functional without first loading configuration data into the IC. The configuration data effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of configuration data. Hardwired circuitry is generally considered to have dedicated circuit blocks and interconnects, for example, that are functional without first loading configuration data into the IC, e.g., PROC 810.

In some instances, hardwired circuitry may have one or more operational modes that can be set or selected according to register settings or values stored in one or more memory elements within the IC. The operational modes may be set, for example, through the loading of configuration data into the IC. Despite this ability, hardwired circuitry is not considered programmable circuitry as the hardwired circuitry is operable and has a particular function when manufactured as part of the IC.

In the case of an SoC, the configuration data may specify the circuitry that is to be implemented within the programmable circuitry and the program code that is to be executed by PROC 810 or a soft processor. In some cases, architecture 800 includes a dedicated configuration processor that loads the configuration bitstream to the appropriate configuration memory and/or processor memory. The dedicated configuration processor does not execute user-specified program code. In other cases, architecture 800 may utilize PROC 810 to receive the configuration data, load the configuration data into appropriate configuration memory, and/or extract program code for execution.

FIG. 8 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 8 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 810 within the IC are for purposes of illustration only and are not intended as limitations.

A system as described herein in connection with FIG. 7, for example, is capable of further processing a circuit design having undergone the processing described herein for implementation within an IC having an architecture the same as or similar to that of FIG. 8. The system, for example, is capable of synthesizing, placing, and routing the circuit design. The system may also generate configuration data that may then be loaded into the IC, thereby physically realizing the circuit design within the IC.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:
1. A method, comprising:
  detecting, using computer hardware, a plurality of Intellectual Property (IP) cores within a circuit design;

extracting, using the computer hardware and from the circuit design, parameterizations for the plurality of IP cores as used in the circuit design;

selecting, using the computer hardware, a machine learning model corresponding to each IP core, wherein each selected machine learning model is specific to the corresponding IP core;

providing to each selected machine learning model as input a target integrated circuit (IC) for the circuit design and the parameterization for the corresponding IP core; and generating, by executing the selected machine learning models, an estimate of resource usage for the circuit design, wherein the resource usage specifies an amount of resources of the target IC needed to implement the circuit design in the target IC.

2. The method of claim 1, wherein each selected machine learning model is trained to generate estimates of resource usage for different parameterizations of the corresponding IP core and for different target integrated circuits.

3. The method of claim 2, wherein each selected machine learning model also is trained to generate estimates of resource usage based on different hardware compiler settings used to implement the circuit design.

4. The method of claim 3, wherein the providing, to each selected machine learning model, includes providing a selected hardware compiler setting to be used to process the circuit design.

5. The method of claim 1, comprising:
comparing the estimate of resource usage with an amount of resources available on the target IC; and
indicating, based on the comparing, whether the circuit design fits on the target IC.

6. The method of claim 1, wherein the generating is performed by executing at least two of the selected machine learning models concurrently in different processes of the computer hardware.

7. The method of claim 1, wherein the circuit design includes a plurality of instances of a selected IP core from the plurality of IP cores detected in the circuit design, and wherein the plurality of instances of the selected IP core have a plurality of different parameterizations, the method comprising:
executing the selected machine learning model for the selected IP core a number of times corresponding to a number of different parameterizations of the selected IP core specified in the circuit design to estimate resource usage for each of the plurality of instances of the corresponding IP core having a different parameterization.

8. The method of claim 1, wherein the estimates of resource usage are specified on a per IP core basis, the method comprising:
caching the estimates of resource usage for each IP core; and
determining a further estimate of resource usage for a modified version of the circuit design by using a cached estimate of a selected IP core of the circuit design that has a same parameterization in the circuit design and the modified version of the circuit design.

9. A system, comprising:
one or more processors configured to initiate operations including:
detecting a plurality of Intellectual Property (IP) cores within a circuit design;
extracting, from the circuit design, parameterizations for the plurality of IP cores as used in the circuit design;
selecting a machine learning model corresponding to each IP core, wherein each selected machine learning model is specific to the corresponding IP core;
providing to each selected machine learning model as input a target integrated circuit (IC) for the circuit design and the parameterization for the corresponding IP core; and
generating, by executing the selected machine learning models, an estimate of resource usage for the circuit design, wherein the resource usage specifies an amount of resources of the target IC needed to implement the circuit design in the target IC.

10. The system of claim 9, wherein each selected machine learning model is trained to generate estimates of resource usage for different parameterizations of the corresponding IP core and for different target integrated circuits.

11. The system of claim 10, wherein each selected machine learning model also is trained to generate estimates of resource usage based on different hardware compiler settings used to implement the circuit design.

12. The system of claim 11, wherein the providing, to each selected machine learning model, includes providing a selected hardware compiler setting to be used to process the circuit design.

13. The system of claim 9, wherein the one or more processors are configured to initiate executable operations comprising:
comparing the estimate of resource usage with an amount of resources available on the target IC; and
indicating, based on the comparing, whether the circuit design fits on the target IC.

14. The system of claim 9, wherein the generating is performed by executing at least two of the selected machine learning models concurrently in different processes of the one or more processors.

15. The system of claim 9, wherein the circuit design includes a plurality of instances of a selected IP core from the plurality of IP cores detected in the circuit design, and wherein the plurality of instances of the selected IP core have a plurality of different parameterizations, wherein the one or more processors are configured to initiate operations comprising:
executing the selected machine learning model for the selected IP core a number of times corresponding to a number of different parameterizations of the selected IP core specified in the circuit design to estimate resource usage for each of the plurality of instances of the corresponding IP core having a different parameterization.

16. The system of claim 9, wherein the estimates of resource usage are specified on a per IP core basis, wherein the one or more processors are configured to initiate operations comprising:
caching the estimates of resource usage for each IP core; and
determining a further estimate of resource usage for a modified version of the circuit design by using a cached estimate of a selected IP core of the circuit design that has a same parameterization in the circuit design and the modified version of the circuit design.

17. A computer program product, comprising:
one or more computer readable storage media, and program instructions collectively stored on the one or more computer readable storage media, wherein the program instructions are executable by computer hardware to initiate operations including:

detecting a plurality of Intellectual Property (IP) cores within a circuit design;

extracting, from the circuit design, parameterizations for the plurality of IP cores as used in the circuit design;

selecting a machine learning model corresponding to each IP core, wherein each selected machine learning model is specific to the corresponding IP core;

providing to each selected machine learning model as input a target integrated circuit (IC) for the circuit design and the parameterization for the corresponding IP core; and generating, by executing the selected machine learning models, an estimate of resource usage for the circuit design, wherein the resource usage specifies an amount of resources of the target IC needed to implement the circuit design in the target IC.

18. The computer program product of claim 17, wherein each selected machine learning model is trained to generate estimates of resource usage for different parameterizations of the corresponding IP core and for different target integrated circuits.

19. The computer program product of claim 18, wherein each selected machine learning model also is trained to generate estimates of resource usage based on different hardware compiler settings used to implement the circuit design.

20. The computer program product of claim 19, wherein the providing, to each selected machine learning model, includes providing a selected hardware compiler setting to be used to process the circuit design.

* * * * *